US006343899B1

(12) United States Patent
Straub et al.

(10) Patent No.: US 6,343,899 B1
(45) Date of Patent: Feb. 5, 2002

(54) MACHINE TOOL

(75) Inventors: Hans Straub; Peter Henzler; Heinz Barthold, all of Bundesrepublik (DE)

(73) Assignee: Ex-Cell-O-GmbH, Eislingen/fils (DE)

( * ) Notice: Subject to any disclaimer, the term of this patent is extended or adjusted under 35 U.S.C. 154(b) by 0 days.

(21) Appl. No.: 09/380,842

(22) PCT Filed: Mar. 18, 1998

(86) PCT No.: PCT/DE98/00801

§ 371 Date: Nov. 18, 1999

§ 102(e) Date: Nov. 18, 1999

(87) PCT Pub. No.: WO98/41350

PCT Pub. Date: Sep. 24, 1998

(30) Foreign Application Priority Data

Mar. 18, 1997 (DE) .......................................... 197 11 317

(51) Int. Cl.⁷ .............................................. B23B 41/12
(52) U.S. Cl. ........................ 408/54; 408/150; 408/156; 408/178
(58) Field of Search ..................... 408/54, 150, 151, 408/153, 156, 173, 178, 708, 234

(56) References Cited

U.S. PATENT DOCUMENTS 4,701,081 A * 10/1987 Hashimoto et al. ......... 408/708
6,012,880 A * 1/2000 Horn et al. .................. 408/708

FOREIGN PATENT DOCUMENTS

| DE | 32 35 916 T1 | 12/1983 | |
|----|----|----|----|
| DE | 34 27 212 A1 | 2/1986 | |
| DE | 36 00 967 C1 | 5/1987 | |
| DE | 257 779 A1 | 6/1988 | |
| DE | 37 37 746 A1 | 6/1988 | |
| DE | 38 22 615 A1 | 1/1990 | |
| DE | 195 40 374 A1 | 5/1997 | |
| DE | 197 12 238 A1 | 10/1998 | |
| EP | 0 301 226 A1 | 2/1989 | |
| EP | 0 556 493 A1 | 8/1993 | |
| JP | 33210 A | * 4/1981 | ................ 408/708 |
| JP | 4504 A | * 1/1987 | ................ 408/54 |
| WO | WO 90/02010 | 3/1990 | |

* cited by examiner

Primary Examiner—Daniel W. Howell
(74) Attorney, Agent, or Firm—Oliff & Berridge, PLC (57) ABSTRACT

There is disclosed a machine tool for machining bores having a large axial length and a boring tool especially suited for a machine tool of this kind in which a boring bar holding at least one tool lip is supported by a steady adapted to be connected to the boring bar 28 via a coupling 48. By the steady the radial excursion of the boring bar during the machining process is reduced to a minimum.

11 Claims, 6 Drawing Sheets

MACHINE TOOL

The invention relates to a machine tool for machining recesses, for instance bores having a large axial length in accordance with the preamble of claim 1 and a tool especially suited for a machine tool of this kind.

Machine tools of this kind are used in series production of case components, for instance of crank/gear cases. By the term machine tool the respectively used machining stations, such as, for instance, transfer units, fine-boring units, special machines, horizontal boring machines or machining centers are understood by which the machining of the cases is effected. An important field of use of such machines is, for example, the machining of crankshaft bearing bores of a bearing channel for supporting the crankshaft or, correspondingly, of a camshaft. Such bearing channels include a plurality of bearing bore sections spaced apart from one another which are formed by case webs. In a four-cylinder engine the crankshaft usually runs fivefold on bearings so that five such bearing bore sections are arranged to be coaxially one behind the other. In dependence on the size of the crankshaft such bearing bores extend over a considerable axial length so that relatively high demands in terms of manufacture are made for forming the bore.

For machining such bearing bores usually so-called "line bore systems" are employed in which a boring bar is introduced from one side into the bore of the bearing. In the following description the plurality of bore sections spaced apart from one another is understood by the bore of a bearing. The boring bar supports a plurality of tool lips spaced apart from one another, wherein each tool lip is assigned to one of the bearing bore sections so that after introduction of the boring bars into the bore of the bearing all bearing bore sections can be machined simultaneously by one feed motion. In order to avoid radial excursions, the end portion of the boring bar guided through the bore sections is supported in a guide bearing, i.e. both end portions of the boring bar run on bearings. For machining the bore section the boring bar and the guide bearings are first aligned, the case is lifted off, the aligned boring bar is inserted into the bore sections, the case is lowered and chucked. After the subsequent machining another aligning step is taken, the case is chucked off and lifted off and the boring bar is removed. This tool has a relatively complex structure, because for each bore section at least one tool lip has to be formed at the boring bar. Moreover a compensation of dimensional variations is very difficult, because a separate compensating means would have to be assigned to each tool lip.

Moreover also systems are known in which merely at an end portion the boring bar supports a premachining cutting edge and a subsequent machining cutting edge so that the bearing bore sections are machined one after the other seen in the feeding direction.

When using such tools and machine tools it has turned out that, in the case of long bores of a bearing and the related necessity to design the boring bar also to have a corresponding length, during the feed motion considerable forces act upon the boring bar in radial direction, which forces guide the same in radial direction and thus have to be taken into consideration during machining. A compensation of these forces requires a considerable expenditure in terms of manufacture so that the desired accuracy during manufacturing the bearing bores frequently can be observed only with difficulties or after a subsequent treatment by a further tool.

In contrast to that, the object underlying the invention is to provide a machine tool and a boring tool especially suited for a machine tool of that kind in which a high dimensional accuracy of the workpieces to be manufactured is ensured with a minimum expenditure in terms of apparatuses.

This object is achieved, in respect of the machine tool, by the features of claim 1 and, in respect of the tool, by the features of claim 9.

The radial excursion of the boring bar vis-a-vis a freely protruding boring bar can be considerably reduced by the measure to support the boring bar by a steady. By the considerable reduction of the radial excursion of the boring bar and thus of the tool lips supported on the boring bar the bearing bore sections of a bearing channel of a crank case, for instance, can be machined with a substantially higher accuracy. The connection of the boring bar with the steady is effected, according to the invention, via an appropriate coupling which may be a conventional chucking device for rotating tools, for instance. Alternatively, the coupling may also be effected by a threaded engagement of the adjacent end portions of the steady and the boring bar.

It is particularly advantageous, if the steady is driven by a spindle so that the speed of the steady can be adapted to the speed of the boring bar before coupling. The threaded engagement may be effected, for instance, by adjusting a predetermined difference in speed, while in the case of a coupling via a known chucking device the steady and the boring bar are driven synchronously at the same speed.

Despite the support via the steady deviations from the desired setting values, which may be caused, for instance, by wear of the lip, lip tolerance, adjusting error or by variations of measure due to changes in temperature of the machine, may nevertheless occur during manufacture. Therefore at is especially advantageous, if the cutting tool and the machine tool are designed with a feed system permitting an adjustment of the cutting edge during machining. A feed system of this kind is described in detail, for example, in a German prior application (Application No. P19712238) of the applicant which is explicitly referred to herewith and whose content also has to be deemed to be part of the disclosure of the present application.

A possibility of designing a feed system of this kind consists in that a cutting tool is fixed via a bending clamp holder to the boring bar and the bending clamp holder can be deflected in radial direction by means of an operating shaft and a control surface formed thereon so as to compensate the errors occurring or else to carry out particular changes in diameter of the bores to be formed in response to the axial length of the bore. Such variations in diameter may be necessary, for instance, in concave, convex or tapered bores or when introducing recesses etc.

For inserting the tool lies into the bearing channel they either have to be brought to a dimension smaller than specified via the feed system or else the relative position between the bearing channel and the boring tool (boring bar, steady) has to be varied such that an insertion is made possible without the lips colliding with the bore walls. This may be effectd, for example, by lifting or lowering the crankcase, which requires a considerable expenditure of work. In accordance with the invention, this drawback is eliminated in that the boring tool itself is received in the machine tool to be movable in radial direction.

In the case of a first alternative, this is achieved by the fact that the work spindle for the boring bar and the spindle for the steady are supported by eccentric spindles so that the aforementioned radial adjustment to a dimension smaller than specified can be performed by the same. In this case also the feed motion can be effected by a corresponding control of the eccentric spindles so that a separate feed system could be dispensed with. This can be additionally provided as an alternative, of course, to make up for manufacturing errors during machining.

As an alternative to the provision of eccentric spindles, each of the work spindle and, where appropriate, also the spindle for the steady can be supported on a feed unit including a cross slide rest so that at least the boring bar is movable in radial direction for inserting the tool into the bearing channel.

An especially compact machine tool is obtained, when the boring bar (and possibly the steady) is provided with cutting tools so that the axial length of the boring tool is smaller than in the case of the solution in which the boring bar merely holds a tool lip.

In the aforementioned development a tool lip is assigned to each bearing bore section so that the bearing bore sections are machined substantially simultaneously, while they are machined successively in the case of a boring tool having one cutting edge.

In the case in which the steady and the boring bar are supporting tool lips, the axial length of these two components is designed to be approximately equal so that the coupling is arranged approximately in the center of the bearing channel (seen in axial direction).

Alternatively to that, the cutting tools may also be formed solely at the boring bar, of course, so that the boring bar passes through the entire bearing channel and the steady is not inserted in the bore sections.

Of course, also other feed systems, for instance including a feed head, or other known systems including a mechanical, hydraulic, pneumatic adjustment can be employed.

The machine tool is advantageously designed to have a central control unit by which the speeds and feeds of the spindle, the steady and, where appropriate, the operating shaft and the feed units supporting the latter means can be coordinated. A digital drive system is advantageously used for the control.

Other advantageous further developments of the invention are the subject matter of the further subclaims.

In the following a preferred embodiment of the invention is described in detail by way of schematic drawings in which.

Figure 1:
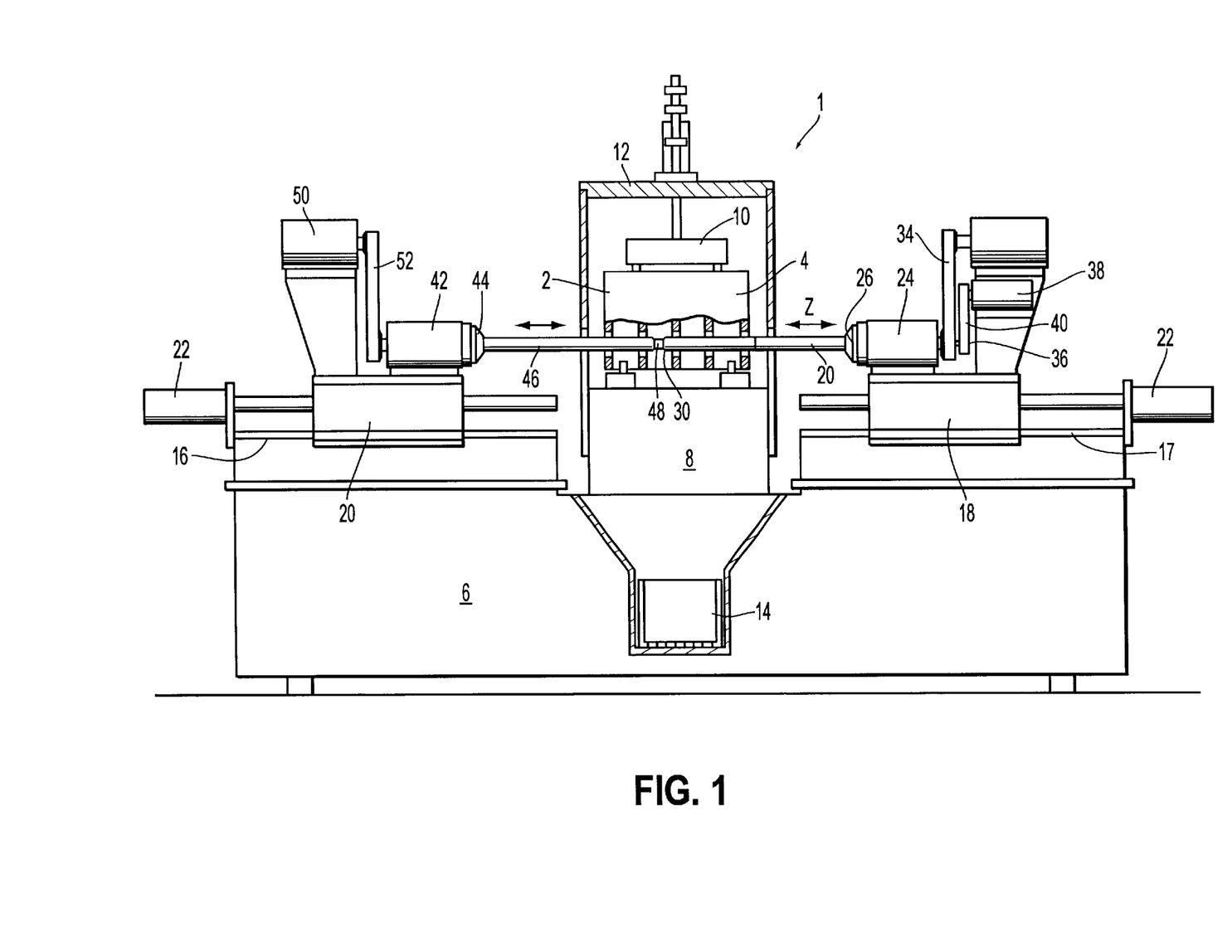
FIG. 1 shows a first embodiment of a machine tool according to the invention designed as transfer unit.

FIG. 1 represents a transfer unit 1 of a transfer line along which a crankcase 2 of an internal combustion engine is machined. The direction of transfer extends normal to the plane of projection in FIG 1. The crankcase 2 is designed to include a bearing channel having five bearing bore sections formed at webs 4 of the crankcase.

The transfer unit comprises a machine bed 6 on which a workpiece carrier 8 is supported. This workpiece carrier 8 may be designed to be movable in the transfer direction (normal to the plane of projection) so that the workpiece to be machines—i.e. the crankcase 2—remains chucked on the workpiece carrier 8. Alternatively, the crankcase 2 may also he transported via appropriate transport means between the successively arranged transfer units and then be chucked on a workpiece carrier 8 mounted on the machine bed 6. In the transfer unit represented in FIG. 1 the crankcase 2 is fixed on the workpiece carrier 8 via a chucking fixture 10 and is enclosed by a covering cap 12 by which the chips and coolants/lubricants are retained during the machining operation. Under the workpiece carrier 8 (view according to FIG. 1) a collecting or storing container 14 for chips and coolants/lubricants is provided. The chucking fixture 10 may be a mechanically, hydraulically or pneumatically operated unit.

On both sides of the workpiece carrier 8 guides 16, 17 for a work spindle feeding slide 18 and, respectively, for a steady feeding slide 20 are formed at the machine bed 6.

The drive of the two feeding slides 18, 20 is effected via suitable electric motors 22 which may be three-phase current motors having a rotary frequency converter (three-phase asynchronous motor), for instance. The work spindle 24 including the corresponding casing and support elements is fastened to the work spindle feeding slide. A boring bar 28 supporting at its end portion remote from the tool holding fixture 26 a finishing tool, hereinafter referred to as cutting tool 30, is fixed to the work spindle 24 via a suitable tool holding fixture 26. The length of the guide 17 is selected so that the boring bar can be completely inserted in the direction of arrow Z into the bearing bore formed by the webs 4 or can be removed therefrom. The work spindle 24 is driven by a speed- and attitude-controlled spindle motor 32 connected with the work spindle 24 via a synchronous belt drive 34 The spindle motor 32 is preferably an (A.C.) servomotor.

In the work spindle 24 an operating shaft 36 which is merely schematically indicated in FIG. 1 is supported which can be driven by a feed motor 38 and a further synchronous belt drive 40.

The cutting tool 30 can be deflected in radial direction via the operating shaft 36. As regards further details of this feed means, reference is made to the following remarks in connection with FIG. 2. Both the spindle motor 32 and he feed motor 38 are supported on the work spindle feeding slide 18 by appropriate brackets.

At the diametrally opposing steady feeding slide 18 there is supported a spindle 42 which is connected via a tool holding fixture 44 with a steady 46 whose outer diameter is selected such that it is adapted to be inserted into the bearing channel formed by the webs 4. The axial length of the steady 46 is larger than the axial length of he bore of the bearing so that the steady 46 can pass through the entire bearing channel.

The boring bar 28 and the steady 46 are adapted to be connected with each other via an appropriate coupling 48 in a bending-resistant manner.

The spindle 42 is driven by a spindle motor 50 which is operatively connected with the spindle 42 via a synchronous belt drive 52. The spindle motor 50 in turn is fixed to the steady feeding slide 20 via a bracket.

All drive motors 22, 32, 38 and 16 ran be controlled by a common control unit so that the respective feeding rates and speeds can be coordinated as required.

When delivering the crankcase 2 to the transfer unit shown in FIG. 1, at first the coupling 48 is released and the two spindle motors are driven so that the work spindle feeding slide 18 and the steady feeding slide 20 are moved along the guides 17 and 16 to the outside, i.e. away from the covering cap 12. By this disengaging movement the boring bar 28 and the steady 46 are moved, with the coupling 48 being released, out of the colliding area with the crankcase 2 and possibly with the covering cap 12 so that the crankcase 2 is adapted to be brought into the machining position. Then the two feeding slides 18, 20 are moved toward the crankcase 2 so that the boring bar 28 and/or the steady 46 are inserted into the bearing bore formed by the webs 4. Usually at first the bearing bore section in that web 4 is formed which is arranged closest to the work spindle 24 (on the right in FIG. 1). I.e. in this case the boring bar 28 is still outside the bearing bore of the steady 46 and is completely inserted into the bearing bore, until its end portion is in a position to contact the boring bar 28. Depending on the type of coupling, the spindle motor 32 and the spindle motor 50 are driven at the same or at a predetermined speed difference so that the coupling 48 is closed and the steady 46 and the boring bar 28 are connected to each other to be torsionally strong and resistant to bending. After adjusting the machining speed via an appropriate control of the spindle motor 32 and the spindle motor 50, then the bore of the bearing is machined, the bearing bore sections in the webs being machined successively from the right to the left. The feed and the speeds of the work spindle 24 and the spindle 42 are adequately coordinated. During machining the radial excursion of the cutting tool 30 is reduced to a minimum by the support of the boring bar 28 via the steady 46 so that defects of fabrication are reduced to a minimum due to this radial excursion even in the case of large lengths of the boring bars.

After machining the entire bore of the bearing, i.e. after the cutting tool 30 has machined the web arranged most on the left in FIG. 1, the coupling 48 is released and the feeding slides 18, 20 are controlled so that the steady 46 and the boring bar 28 are moved out of the bearing bore. The crankshaft 2 including the bearing bore brought to size can then be moved to the next transfer unit of the transfer line.

Any coupling means may be used for the coupling 48. What is essential is that the coupling is designed to be sufficiently resistant to bending so that the steady 46 is adapted to support the boring bar 28 in the desired way. For instance, commercial chucking fixtures may be used to connect the steady 46 to the boring bar 28. In this case the work spindle 24 and the spindle 42 are driven at the same speed during the coupling/decoupling operation. It is also conceivable that the coupling is effected by a threaded engagement between the steady 46 and the boring bar 28. In this case the steady 46 is operated at a predetermined difference in speed with respect to the boring bar 28 so that the threaded engagement is either brought about or released. After a predetermined screwing depth is reached, both spindles are driven at the same speed.

Figure 2:
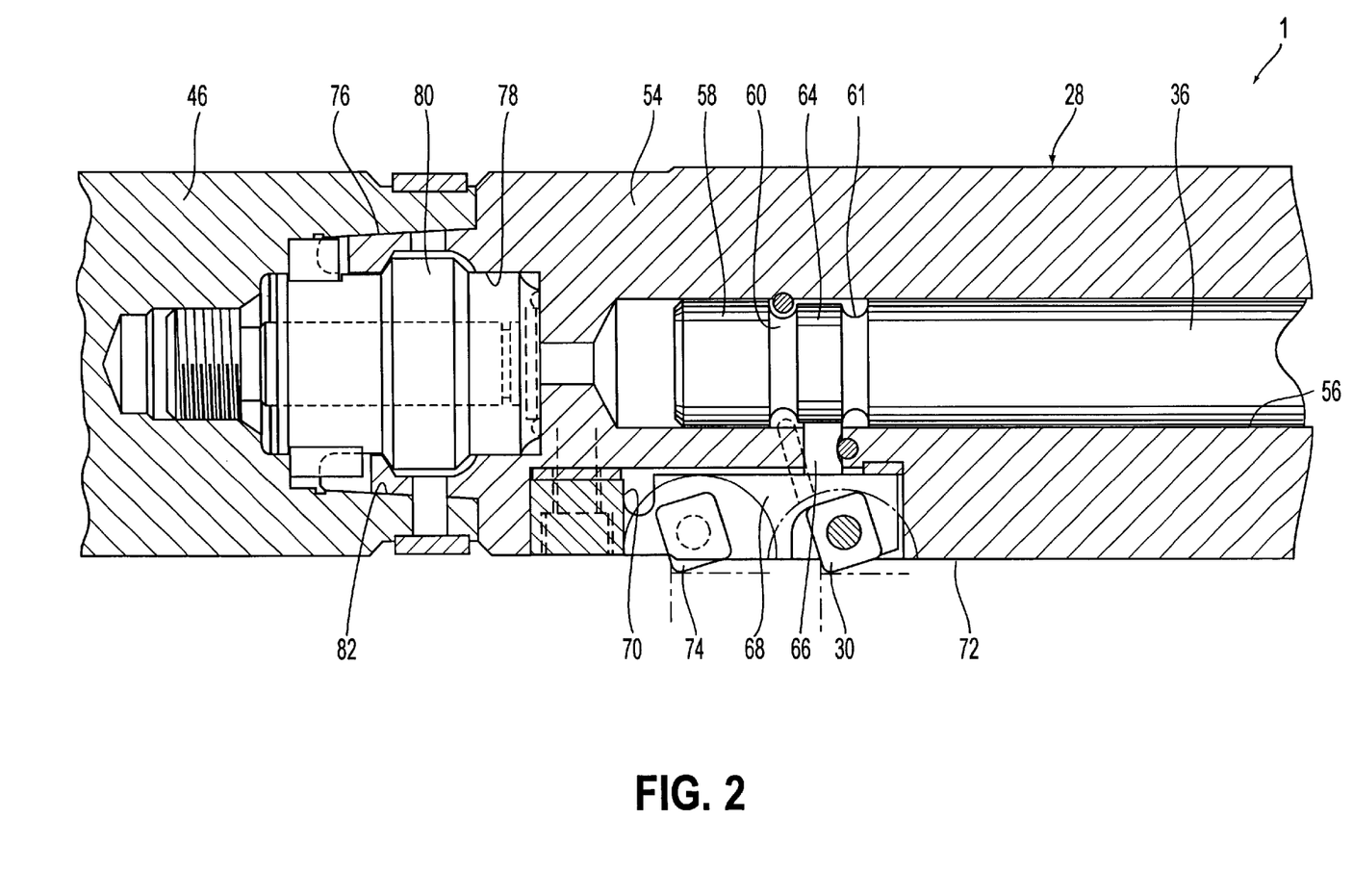
FIG. 2 is a detailed representation of a boring tool to be employed with the machine tool of FIG. 1.

By way of FIG. 2 herein after an embodiment of a tool is represented which can be employed in the transfer unit of FIG. 1. FIG. 2 is a partial representation of the boring tool used in the transfer unit 1 of FIG. 1, wherein merely the parts arranged in the coupling area are represented.

Accordingly, the boring bar 28 includes an end portion 54 at its freely protruding end portion. The axial bore 56 is continued even in the end portion 54. In the boring bar 28 the operating shaft 36 passing through the axial bore 56 is supported. A control member 58 is formed at the end portion of the operating shaft 36 shown in FIG. 2.

At the outer periphery of the control member 58 two annular grooves 60, 61 are formed between which a cam portion having a control surface 64 is formed. The control surface 64 is bent in the form of an involute—seen in the cross-sectional direction—in the embodiment represented in FIG. 2.

A pin 66 guided in a radial bore of the end portion 54 is in contact with the control surface 64. The axial length of the pin 66 is selected to be larger than the wall thickness of the end portion 54 in the area of the radial bore so that the end portions of the pin 66 protrude into the axial bore 56 and/or beyond the outer periphery of the end portion 54. A bending tool fixture 68 fixed in a flattening of the end portion 54 by means of a fastening screw is supported at the end portion of the pin 66 remote from the control surface 64. The bending tool fixture 68 has a recess 70 which assists the spring action. The resilient end portion of the bending tool fixture 68 can be brought into contact with the adjacent end portion of the pin 66 so that the latter is biased against the control surface 64 by the bending tool fixture 68. The cutting tool 30—an indexable insert in the present case—is supported on the bending tool fixture 68 in the area of the pin. The stop position of the bending tool fixture 68 at the end portion 54 is determined by a stop plate 72.

The control surface is twisted by a relative twisting of the operating shaft 36 with respect to the boring bar 28 so that, due to the form of an involute, the pin is displaced inwardly or outwardly in axial direction depending on the direction of rotation and is deflected in radial direction in accordance with the bending tool fixtures 68. By the excursion of the bending tool fixture 66 the cutting tool 30 can be brought into the desired feeding position which is necessary to compensate a defect occurring during manufacture or to vary the diameter of the bearing bore in response to the feed.

Accordingly a feed motion is effected, when the machining shaft 36 is driven at a difference in speed with respect to the boring bar 28. As soon as the operating shaft 36 and the boring bar 28 are driven synchronously at equal speeds, there is no axial displacement of the pin 66 so that no feed motion is effected, either. As regards further details of the feed system represented in FIG. 2, reference is made to the applicant's patent application quoted in the beginning.

As indicated by thinner lines in FIG. 2, a premachining tool lip 74, by which the bore of the bearing to be formed can be roughly brought to size, can be assigned to the tool lip 30. In order to prevent a balance error of the boring tool, plural premachining lips can be distributed along the circumference of the end portion 54. These premachining lips 74 are designed not to be movable in the feed direction.

At the end portion on the left in FIG. 2 of the end portion 54 a coupling cone 76 is formed. In the area of this coupling cone the end portion 54 includes a location hole 78 into which the coupling 80, for instance a four-point chucking set, can be inserted to bias the coupling cone 76 against an internal cone 82 of the steady 46.

The coupling 80 is screwed with a fastening portion into an internal bore 78 of the steady 46.

In the coupling position the conical contact faces of the steady 46 and of the end portion 54 as well as the two annular faces of these two components are an full-surface contact so that a bending-resistant and torsionally strong connection of the steady 46 with the boring bar 28 is ensured.

Of course, also other coupling designs can be used for the connection of the steady 46 with the boring bar 28.

In the variant represented in FIG. 2, for coupling the steady 46 to the boring bar 28 both components are moved toward each other by the assigned drive motors (FIG. 1) at an equal speed or in standstill above the feed slide 18, 20 until the coupling is engaged.

In the embodiment of the coupling with a threaded engagement the steady 46 must be operated at a difference in speed with respect to the boring bar 28.

By supporting the boring bar 28 by means of the driven steady 46 the resistance to bending of the boring tool can be substantially increased so that the radial excursion of the boring bar 28 occurring during the machining process in the area of the tool lips (30, 74) is reduced to a minimum. The bearing bores of the crankcase 4 thus can be formed with a considerably higher accuracy. Nevertheless occurring errors can be compensated through the feed system integrated in the boring bar 28.

In the above-described embodiment of a boring tool and a machine tool the boring bar 28 is merely provided with a cutting tool 30 and a boring tool lip 74 by which all boring sections of the webs 4 are successively machined.

The axial lengths of the boring bar 28 and the steady 46 must be somewhat larger than the total axial length of the bearing channel of the crankcase 2 so that the tool lip can be displaced from the first web 4 of the crankcase 2 to the last web of the crankcase seen in the direction of machining. In this case it is principally possible, for instance in the representation according to FIG. 1, to machine the webs 4 in the sequence from the right to the left so that the feed direction is selected correspondingly from the right to the left (FIG. 1) (push version). It is principally also possible to first adjust the cutting tool 30 of the boring bar 28 by means of the feed system to a dimension smaller than specified and to insert the boring bar into the bearing channel so thaw the boring bar 28 passes through the entire crankcase 2. Subsequently, the boring bar 28 is coupled with the steady 46 and the machining of the webs 4 is effected in the representation according to FIG. 1 from the left to the right (draw version).

This way of proceedings with comparatively large feeds in the Z-direction corresponding approximately to the axial length of the crankcase 2 can be used in an economically reasonable manner only in the case of very high cutting rates. With lower cutting rates and in the case of crankcases having very large axial lengths and comparatively low bearing bore diameters, the embodiments described in the following are preferred.

Figure 3:
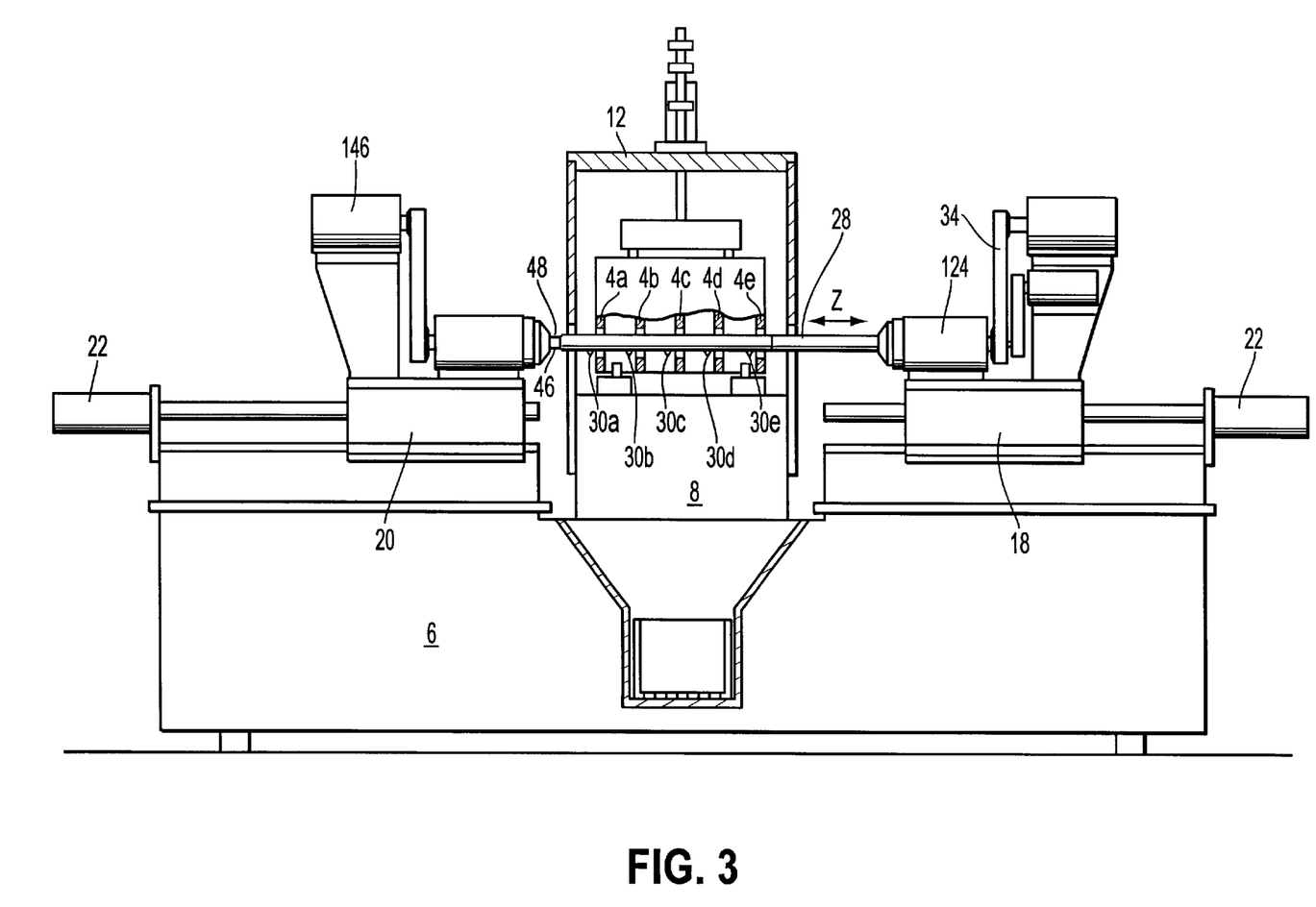
FIG. 3 shows a second embodiment of a machine tool in which the boring tool is supported by eccentric spindles.
Figure 4:
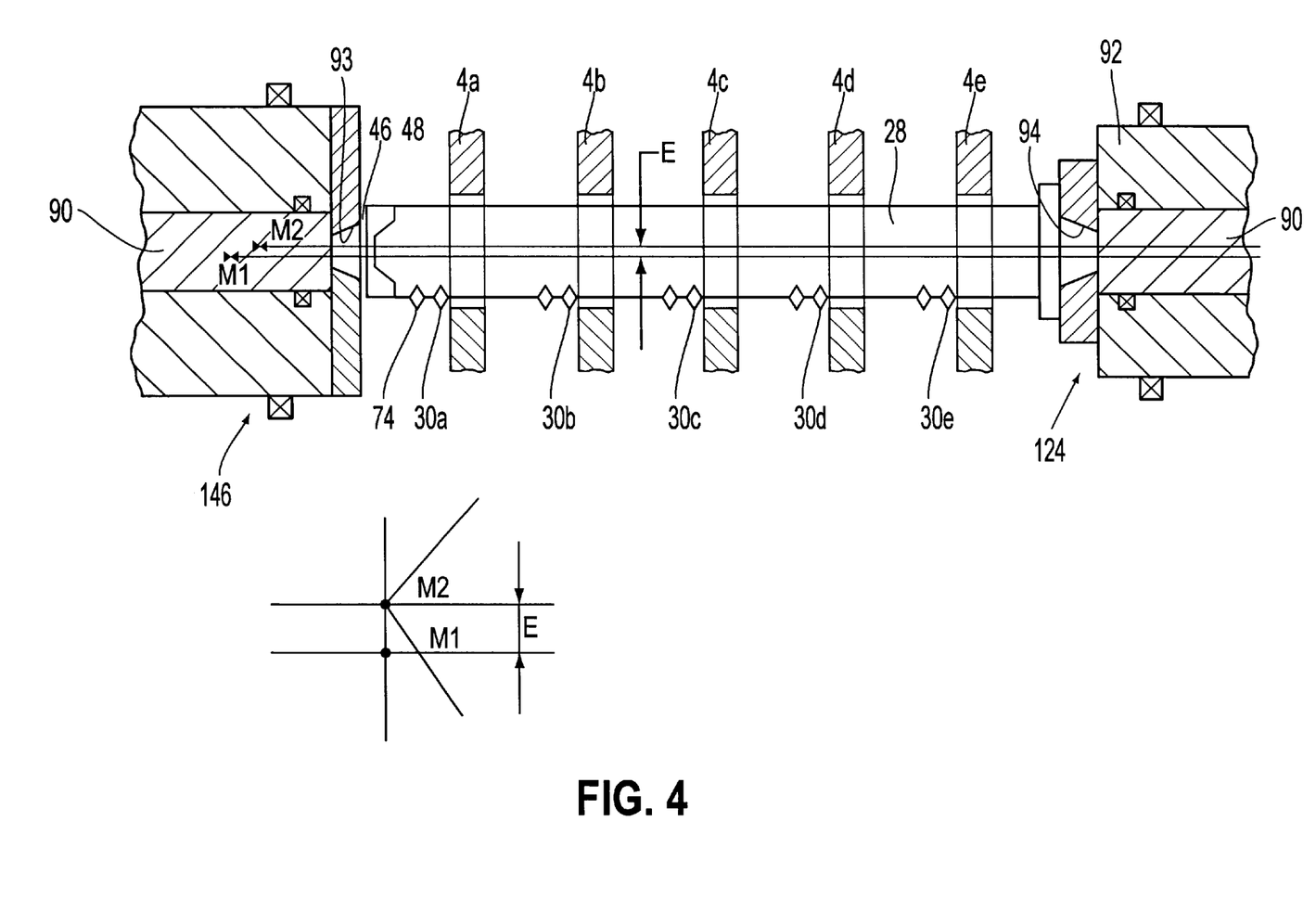
FIG. 4 is a schematic representation of the boring tool of the machine tool of FIG. 3.

In the embodiment described by way of the FIG. 3 and 4 the boring bar 28 supports for each of the webs 4a to 4e a separate cutting tool 30a to each of which in turn a premachining tool including a premachining lip 74 may be assigned. The axial length of the boring bar 28 is selected to be somewhat larger than the axial length of the crankcase 2 so that, in the case of an immersion of the boring bar 28 in the representation according to FIG. 3 from the right, the left cutting tool 30a can be brought into its machining position with respect to the assigned web 4a. The steady 46 has a comparatively very short design and consists substantially only of a seat for the coupling 48.

The other components of the machine tool, such as the bed 6, the work spindle and steady feeding slide 18, 20, the workpiece carrier 8 and the covering cap 12 and the assigned drives 22 substantially correspond, as to their design, to the corresponding components of the machine tool represented in FIG. 1. Since in the above-described embodiment the feed during machining is merely somewhat larger than the width of the webs 4a to 4e, the guide for the steady feeding slide 20 can be designed to be somewhat shorter.

The overall length of the boring tool including the steady 46 and the boring bar 28 is considerably shorter than that of the above-described embodiment so that a machining tool which is more resistant to bending is obtained.

In contrast to the above-described embodiments, the boring bar 28 and the steady 46 are not supported by conventional spindles but by an eccentric spindle 124 (boring bar 28) and 146, resp., (steady 46). By these eccentric spindles 146, 124 the boring bar 28 and the steady 46 can be displaced in radial direction, i.e. transversely to the longitudinal axis of the bearing channel.

FIG. 4 shows a schematic representation of the boring tool including the steady 46, the coupling 48 and the boring bar 28.

Each of the steady 46 and the boring bar 28 are clamped in a schematically indicated eccentric spindle 146 and 124, respectively. Such eccentric spindles comprise an internal spindle 90 which is eccentrically supported in an external spindle 92. The axis of rotation of the external spindle is denoted with M1 in the representation according to FIG. 4. The axis of rotation of the internal spindle 90 has the reference numeral M2. The radial distance between the two axes M1, M2 defines the eccentricity E which in turn defines the radial position of the tool lips of the finishing tool 30 and of the premachining tool. That is to say, by the relative twist of the internal spindle 90 with respect to the external spindle 92 the boring tool can be displaced in radial direction. The design of such eccentric spindles 124, 146 is known already from prior art so that reference is made to the existing technical literature. The steady 46 and the boring bar 28 are clamped in the eccentric spindles 24 and 146, respectively, by means of suitable chuck couplings (e.g. HSK) 93, 94.

The drive so the external and internal spindles 92, 90 is effected by appropriate drive means, for instance toothed belts 34 and gearwheels.

In the embodiment represented in FIG. 4 the cutting tools 30, 74 are fed and manufacturing variations are compensated by an adequate control of the two eccentric spindles 124, 146 which can be synchronously controlled via a common control unit. Principally the boring tool can also be provided with a feed system according to FIG. 2, however, with an operating shaft 36, to which a separate drive is assigned, passing through the boring bar 28 in that case. By such a feed means then all cutting edges 30, for instance, could be moved in radial direction to compensate manufacturing variations. Instead of the above-described feed system including an operating shaft 36 etc., of course other feed systems such as, e.g., piezoelectric systems and the like can also be used by which each cutting edge 30a, 30b could possibly be separately controlled.

For machining the webs 4a, 4b . . . the boring bar 28 is initially brought to a dimension smaller than specified via the eccentric spindle 124 and, in the representation according to FIG. 4, it is introduced from the right into the bearing channel, until the cutting tool 30a and the premachining tool including the premachining cutting edge 74 are arranged ahead of the last web (seen in the direction of introduction). At the same time, the steady 46 has been adjusted via the eccentric spindle 146 to the same dimension smaller than specified E so that the boring bar 28 and the steady 46 can be connected via the coupling 48.

Subsequently, the boring tool is adjusted to the boring or turning size by a synchronous control of the eccentric spindles 146, 124 and the two feed slides 18, 20 are displaced in the Z direction, until the boring bar 28 has reached the position shown in FIG. 4—the webs 4a, 4b are finished. Principally the tool lips can also be adjusted synchronously during machining.

By the above-described variant including separately adjusted tool lips the work tolerances at each individual web can be compensated independently of each other so that the quality of manufacture can be further improved.

Subsequently to the machining the steady 46 is separated from the boring bar 28, the latter is adjusted to a dimension smaller than specified by the eccentric spindle 124 and then is removed from the crankcase without a collision.

Figure 5:
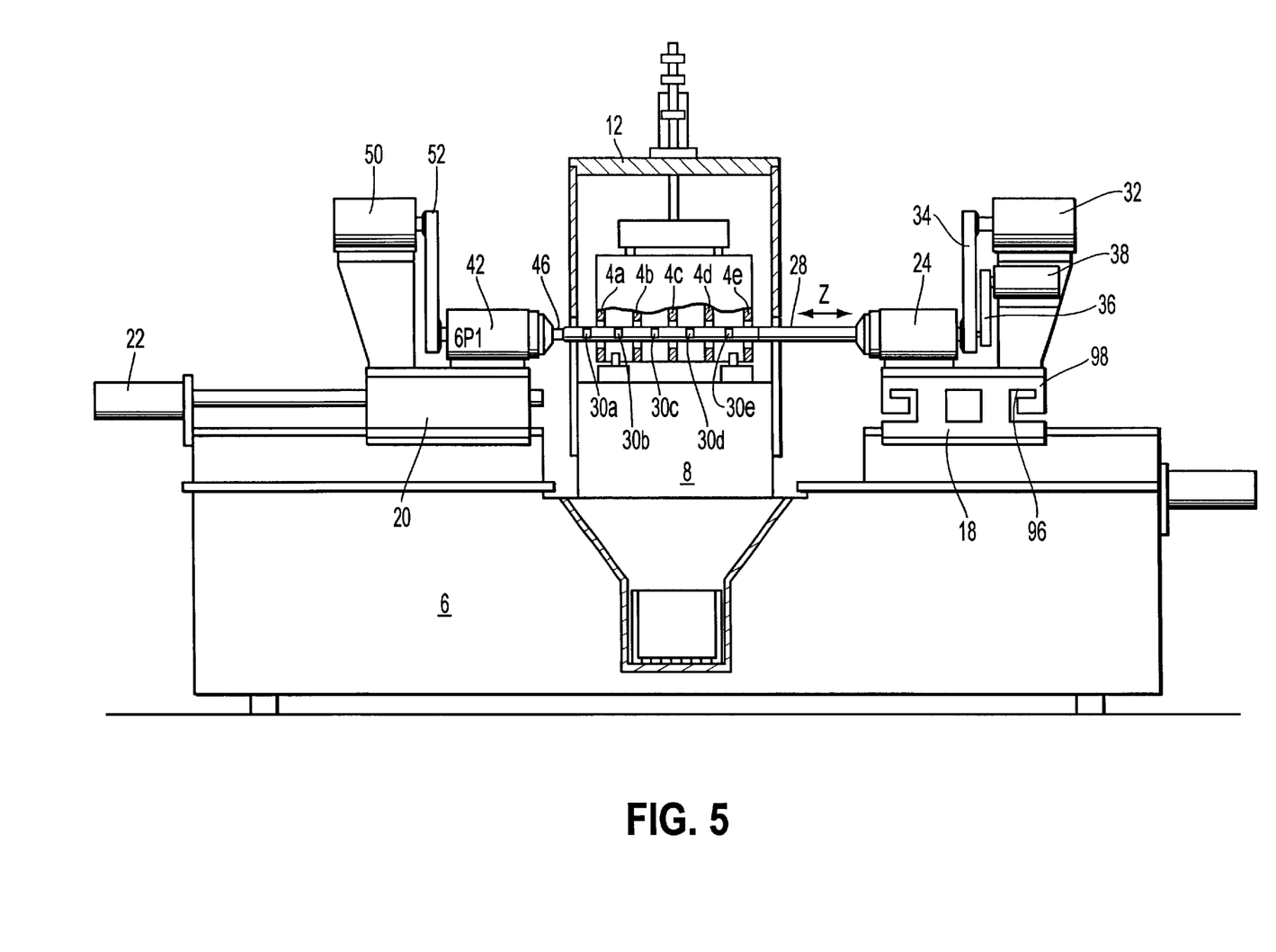
FIG. 5 shows a third embodiment of a machine tool in which the work spindle is supported on a cross slide rest and FIG. 6 is a schematic representation of the boring tool of the machine tool of FIG. 5.
Figure 6:
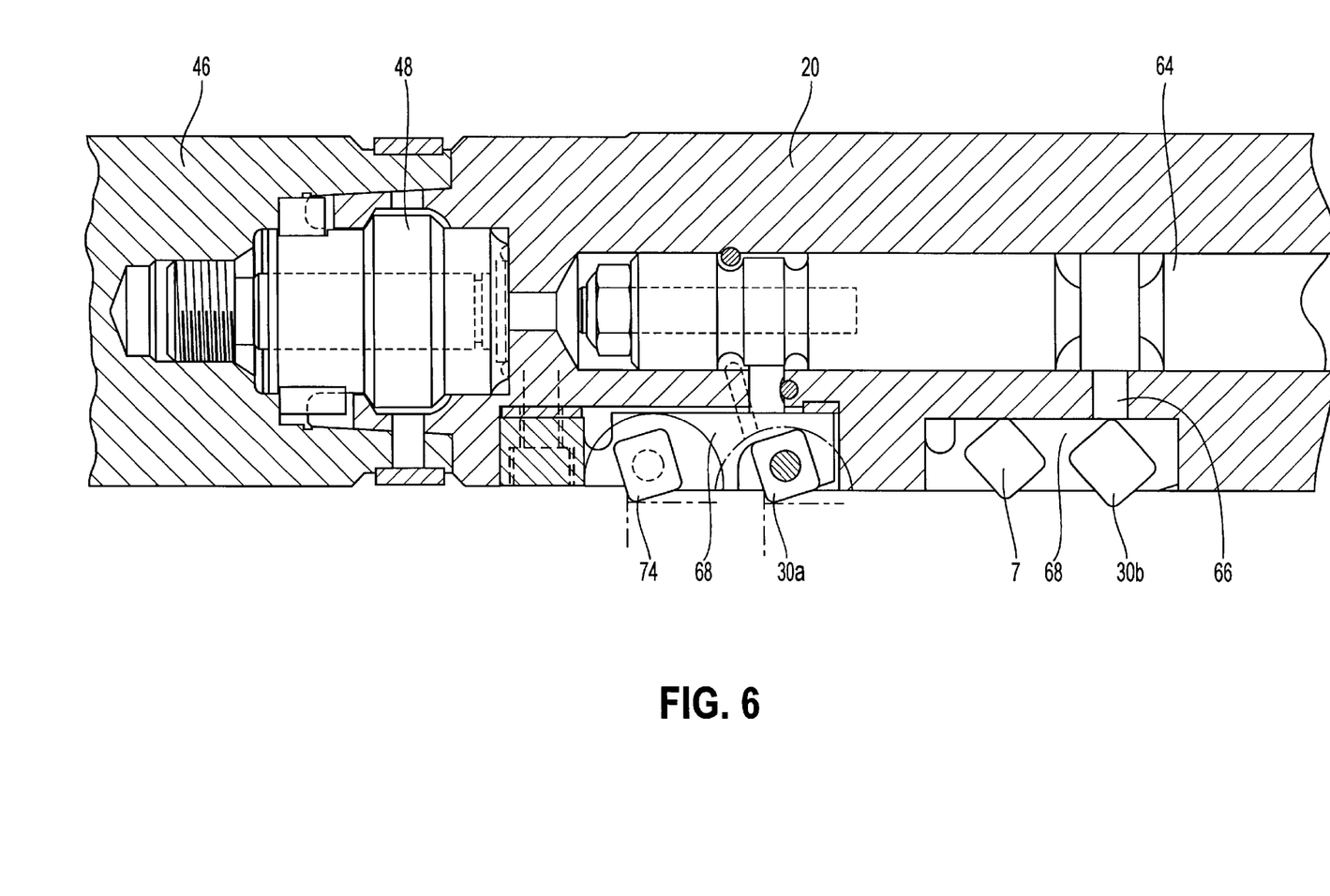

In the FIGS. 5 and 6 a third embodiment of a machine tool 1 according to the invention (transfer machine) is represented. The boring tool used in this case and comprising a steady 46, a boring bar 28 and a coupling 48 principally has the same design as the above-described embodiment. I.e., a separate cutting tool 30 and, where appropriate, again a premachining cutting edge 74 is assigned to each of the webs 4a, 4b . . . The drive of the steady 46 and the boring bar 28 is effected by means of a spindle 42 and a work spindle 214, resp., which are supported on assigned feeding slides 20 and 18, resp., and are driven by adequate spindle drives 50, 52 and 32, 34, respectively. Apart from the number of cutting edges, the design of the above-mentioned components substantially corresponds to that of the embodiment represented in FIG. 1 so that, to simplify matters, reference is made to the respective description in this regard. The cutting edges are fed via a feed system as explained by way of FIG. 2. The drive 38 for the operating shaft 36 of the feed system is likewise supported on the work spindle feeding slide 18.

The substantial difference between the embodiment according to FIG. 1 and the embodiment according to FIG. 5 consists in the fact that the work spindle feeding slide 18 is a cross slide rest and includes a guide 96 extending perpendicular to the plane of projection in FIG. 5 on which a cross slide rest 98 is guided. The latter supports the work spindle 24 including the drives 32, 38. The cross slide rest 98 can be displaced in transverse direction (vertical plane of projection) by an adequate drive motor.

This cross slide rest 98 permits to provide the boring bar 28 with a plurality of tool lips and nevertheless to use conventional spindles 24, 42 (without radial adjustment).

FIG. 6 shows the part of the boring tool provided at the coupling side including the end portion of the steady 46, the chuck coupling 48 and the boring bar 20. The latter supports for each web 4a, 4b . . . a cutting tool 30a, 30b . . . to each of which a premachining tool including a premachining cutting edge 74 is assigned.

Each of the cutting tools 30 is accordingly accommodated as in the case of the embodiment according to FIG. 2 in a bending tool fixture 68 upon which a pin 66 adapted to be displaced in axial direction via a control surface 64 of the operating shaft 36 is acting. In the illustrated embodiment the radial position of the premachining cutting edge 74 is not adjustable. In the case of this embodiment, too, all cutting tools 30 are adjusted synchronously. Also in this case other systems, for instance piezoelectric systems, could be used by which an individual adjustment of the tool lips is possible.

The tool lips 30, 74 are brought in a horizontal position (perpendicular to the plane of projection in FIG. 5) for introducing the boring bar 28 and are brought into the rise position (off-center) by moving the cross slide rest 98. After that the boring bar 28 can be introduced into the bearing channel without a collision of the tool lips, until the tool lip of the cutting tool 30a shown in the front in FIG. 6 is disposed ahead of the assigned web 4a. Subsequently the boring or turning measure is brought into the machining position by driving the cross slide rest 98, and the boring bar 28 is connected to the steady 46 via the coupling 48. After a synchronous drive of the two spindles 24, 42 and a feed of the feeding slides 18, 20 corresponding approximately to the width of the webs 4, the cutting edges are in the position indicated in FIG. 5—the webs 4a . . . are finished. After the boring bar 28 has been aligned, the steady 46 is decoupled from the boring bar 28 and is brought into the rise position after a minor adjustment of the cross slide rest 98 and is moved out of the bearing channel so that the next workpiece can be fed.

The latter variants of a small axial length of the boring tool permit a very bending-resistant design, wherein a biased rigid system is provided enabling the boring tool to be guided practially without play.

In deviation from the afore-described embodiments also the steady 46 can be equipped with tool lips so that then the coupling would be disposed approximately in the center (as in the case of the embodiment according to FIG. 1). In a design including a cross slide rest 98 also the spindle 42 would then have to be supported on a cross slide rest for driving the steady 46. Of course, also the steady 46 of the boring tool shown in FIG. 3 can be provided with tool lips so that the steady 46 itself is designed to be a boring bar. By the latter embodiments in which the steady 46 and the boring bar 28 have cutting edges and are designed to have an approximately equal length the cycle time can be slightly reduced, because both parts can be simultaneously introduced into the bearing channel for coupling and thus have to cover only half the feeding distance compared to embodiment shown in FIG. 3. The operating shaft may supported in the boring bar 26 and/or in the steady 46.

There is disclosed a machine tool for machining bores having a large axial length and a boring tool which is suited especially for a machine tool of this kind in which a boring bar holding at least one tool lip is supported by means of a steady that can be connected to the boring bar 28 via a coupling 48. By the steady the radial excursion of the boring bar during the machining process is reduced to a minimum.

What is claimed is:

1. A machine tool for machining recesses of boring sections spaced apart from each other comprising a boring bar driven by a work spindle said boring bar holding at least one cutting tool and being adapted to be introduced into a bore from one side for machining the boring sections, a work spindle feeding unit for moving said boring bar into a feed direction, and a feed means for adjusting the cutting tool, characterized by a steady which is supported on a feeding unit and by a coupling by which said steady is adapted to be connected to said boring bar.

2. A machine tool according to claim 1, characterized in that said steady (46) is adapted to be driven by a spindle (42, 146).

3. A machine tool according to claim 1, characterized in that at least one cutting tool is adjustable in a radial direction with respect to the axis of the boring bar by said feed means.

4. A machine tool according to claim 1, characterized in that said work spindle and the spindle are eccentric spindles (124, 126) adapted to be synchronously driven.

5. A machine tool according to claim 1, wherein at least one of said work spindle and the spindle is supported on a feeding unit including a cross slide rest.

6. A machine tool according to claim 3, wherein said feed means includes an operating shaft which is guided in any one of said boring bar, said work spindle and the spindle, and is driven by a feed motor and which has control surfaces respectively assigned to a cutting tool, said cutting tool being adjustable in a radial direction with respect to the feeding direction via said control surfaces by means of a transfer mechanism supported on the boring bar by a difference in speed between said operating shaft and said spindles.

7. A machine tool according to claim 1, characterized in that said coupling means (48) is a chuck coupling.

8. A machine tool according to claim 1, characterized in that a cutting tool (30) is assigned to each bore section.

9. A boring tool, especially for a machine tool according to claim 1, comprising a boring bar (28) on which a plurality of cutting tools (30) are provided, characterized by a drivable steady (46) coupled with said boring bar (28) via a coupling means (48).

10. A boring tool according to claim 9, wherein said steady has a boring bar as the steady including at least one cutting tool which can be connected to said boring bar via said coupling means.

11. A boring tool according to claim 10, characterized in that said boring bar (28) and said boring bar of said steady have approximately equal axial lengths.

* * * * *

UNITED STATES PATENT AND TRADEMARK OFFICE
CERTIFICATE OF CORRECTION

PATENT NO.    : 6,343,899 B1
DATED         : February 5, 2002
INVENTOR(S)   : Hans Straub et al.

It is certified that error appears in the above-identified patent and that said Letters Patent is hereby corrected as shown below:

The title page should be deleted to appear as per attached title page.

The drawing figures consisting of figures 1, 2, 3 and 5 should be deleted to appear as per attached Figures 1, 2, 3 and 5.

Column 2,
Line 31, replace "at" with -- it --
Line 50, replace "lies" with -- lips --
Line 56, replace "effectd" with -- effected --

Column 3,
Line 64, replace "machines" with -- machined --

Column 5,
Line 6, replace "of" with -- and --

Column 6,
Line 20, replace "66" with -- 68 --
Line 24, replace "machining" with -- operating --
Line 39, replace "At the end portion on the left in FIG. 2 of the" with -- As shown in Fig. 2, at the left side of the --

Column 7,
Line 21, replace "thaw" with -- that --

Column 8,
Line 26, replace "24" with -- 124 --
Line 28, replace "so" with -- of --

Column 10,
Line 38, replace "26" with -- 28 --
Line 67, replace "126" with -- 146 --

UNITED STATES PATENT AND TRADEMARK OFFICE
CERTIFICATE OF CORRECTION

PATENT NO. : 6,343,899 B1
DATED : February 5, 2002
INVENTOR(S) : Hans Straub et al.

It is certified that error appears in the above-identified patent and that said Letters Patent is hereby corrected as shown below:

<u>Column 12,</u>
Line 5, replace "driv" with -- drive --

Signed and Sealed this

Second Day of September, 2003

JAMES E. ROGAN
*Director of the United States Patent and Trademark Office*

United States Patent
Straub et al.

(10) Patent No.: US 6,343,899 B1
(45) Date of Patent: Feb. 5, 2002

(54) MACHINE TOOL

(75) Inventors: Hans Straub; Peter Henzler; Heinz Barthold, all of Bundesrepublik (DE)

(73) Assignee: Ex-Cell-O-GmbH, Eislingen/fils (DE)

( * ) Notice: Subject to any disclaimer, the term of this patent is extended or adjusted under 35 U.S.C. 154(b) by 0 days.

(21) Appl. No.: 09/380,842

(22) PCT Filed: Mar. 18, 1998

(86) PCT No.: PCT/DE98/00801

§ 371 Date: Nov. 18, 1999

§ 102(e) Date: Nov. 18, 1999

(87) PCT Pub. No.: WO98/41350

PCT Pub. Date: Sep. 24, 1998

(30) Foreign Application Priority Data

Mar. 18, 1997 (DE) .......................... 197 11 317

(51) Int. Cl.[7] .............................. B23B 41/12
(52) U.S. Cl. ................ 408/54; 408/150; 408/156; 408/178
(58) Field of Search .............. 408/54, 150, 151, 408/153, 156, 173, 178, 708, 234

(56) References Cited

U.S. PATENT DOCUMENTS 4,701,081 A * 10/1987 Hashimoto et al. ......... 408/708
6,012,880 A * 1/2000 Horn et al. ................ 408/708

FOREIGN PATENT DOCUMENTS

| DE | 32 35 916 T1 | 12/1983 | | |
|---|---|---|---|---|
| DE | 34 27 212 A1 | 2/1986 | | |
| DE | 36 00 967 C1 | 5/1987 | | |
| DE | 257 779 A1 | 6/1988 | | |
| DE | 37 37 746 A1 | 6/1988 | | |
| DE | 38 22 615 A1 | 1/1990 | | |
| DE | 195 40 374 A1 | 5/1997 | | |
| DE | 197 12 238 A1 | 10/1998 | | |
| EP | 0 301 226 A1 | 2/1989 | | |
| EP | 0 556 493 A1 | 8/1993 | | |
| JP | 33210 A | * 4/1981 | | 408/708 |
| JP | 4504 A | * 1/1987 | | 408/54 |
| WO | WO 90/02010 | 3/1990 | | |

* cited by examiner

*Primary Examiner*—Daniel W. Howell
(74) *Attorney, Agent, or Firm*—Oliff & Berridge, PLC (57) ABSTRACT

There is disclosed a machine tool for machining bores having a large axial length and a boring tool especially suited for a machine tool of this kind in which a boring bar holding at least one tool lip is supported by a steady adapted to be connected to the boring bar 28 via a coupling 48. By the steady the radial excursion of the boring bar during the machining process is reduced to a minimum.

11 Claims, 6 Drawing Sheets